(12) United States Patent
Kataoka (10) Patent No.: US 12,104,629 B2
(45) Date of Patent: Oct. 1, 2024

(54) FASTENER

(71) Applicant: NEWFREY LLC, New Britain, CT (US)

(72) Inventor: Shin Kataoka, Utsunomiya (JP)

(73) Assignee: NEWFREY LLC, New Britain, CT (US)

( * ) Notice: Subject to any disclaimer, the term of this patent is extended or adjusted under 35 U.S.C. 154(b) by 15 days.

(21) Appl. No.: 18/049,450

(22) Filed: Oct. 25, 2022

(65) Prior Publication Data

US 2023/0131103 A1  Apr. 27, 2023

(30) Foreign Application Priority Data

Oct. 25, 2021 (JP) ................... 2021-173661

(51) Int. Cl.
*F16B 19/10* (2006.01)

(52) U.S. Cl.
CPC .......... *F16B 19/10* (2013.01); *F16B 19/1081* (2013.01); *Y10T 24/309* (2015.01)

(58) Field of Classification Search
CPC ..... Y10T 24/42; Y10T 24/309; Y10T 24/303; Y10T 24/30; Y10T 24/45487; F16B 21/065; F16B 19/1081; F16B 19/10
See application file for complete search history.

(56) References Cited

U.S. PATENT DOCUMENTS

| 4,122,583 | A | * | 10/1978 | Grittner | .............. | F16B 19/1081 |
| | | | | | | 411/509 |
| 8,926,244 | B2 | | 1/2015 | Sasaki | | |
| 2011/0164942 | A1 | * | 7/2011 | Sambommatsu | ... | F16B 19/1081 |
| | | | | | | 411/360 |
| 2013/0149066 | A1 | * | 6/2013 | Handa | ................. | F16B 19/1081 |
| | | | | | | 411/57.1 |
| 2020/0263717 | A1 | * | 8/2020 | Banno | .................... | F16B 5/0664 |
| 2024/0018983 | A1 | * | 1/2024 | Murray | ................. | F16B 21/086 |

* cited by examiner

*Primary Examiner* — Robert Sandy
*Assistant Examiner* — Michael S Lee
(74) *Attorney, Agent, or Firm* — Michael P. Leary (57) ABSTRACT

A fastener provided with a pin and a body configured to insert the pin. The pin has a pin flange and a pin shaft extending in the vertical direction from the pin flange; and the main body has a bottom, an opening formed in the bottom for inserting the pin, a member to be mounted locking part formed vertically from the bottom along the opening in order to lock to the member to be mounted, a pin flange temporary holding part for temporarily fixating, before attaching to the member to be mounted, the pin flange at a first position opposite to the member to be mounted locking part relative to the bottom, and a pin flange lock for locking the pin flange at a second position closer to the bottom than the first position while mounted on the member to be mounted.

16 Claims, 12 Drawing Sheets

FASTENER

CROSS-REFERENCE TO RELATED APPLICATIONS

This application claims priority from Japanese Patent Application No. 2021-173661, filed on Oct. 25, 2021, the entire disclosure of which is incorporated herein by reference.

BACKGROUND OF THE PRESENT INVENTION

The present invention relates to a fastener used to attach mounting members such as bumper retainers, protectors and interior parts to members to be mounted such as automobile panels. More specifically, it relates to a fastener that pushes a pin into a body and fastens it.

Generally, fasteners (clips) are used to attach mounting members such as bumper retainers, protectors and interior parts to members to be mounted such as automobile panels. A fastener consisting of a combination of a pin and a main body (grommet), in which a pin is press-fitted into the opening of the body of the main body, the diameter of the locking claw provided on the body is expanded and the fastener is locked in the mounting hole of the member to be mounted, is often used. With such a fastener, the mounting member can be easily mounted on the member to be mounted simply by pushing the pin into the hollow portion of the main body.

In the prior art, as in Patent Document 1, Japanese Unexamined Patent Application Publication No. 2011-231850, a structure for temporarily holding and locking the pin on the main body is provided on the pin tip side; however, since a part that is structurally undercut is formed, it is necessary to provide a slide core in the mold, and improvement in manufacturing cost has been needed. On the other hand, improving the quality of fasteners while reducing the manufacturing cost is also needed. For example, the sealing property between the pin and the main body is not sufficient, and it cannot be used in a part that must be waterproof.

Patent Document 1 Japanese Unexamined Patent Application Publication No. 2011-231850 (U.S. Pat. No. 8,926,244).

SUMMARY OF THE INVENTION

Therefore, an object of the present invention is to improve the manufacturing cost of a fastener composed of a pin and a main body. A further object of the present invention is to improve the quality such as the waterproof performance of the fastener while improving the manufacturing cost of the fastener.

To achieve these objects, a first aspect of the present invention is a fastener provided with a pin and a body configured to insert the pin; wherein the pin has a pin flange, and a pin shaft part extending in the vertical direction from the pin flange; and the main body has a bottom part, an opening part formed in the bottom part for inserting the pin, a member to be mounted locking part formed vertically from the bottom part along the opening part in order to lock to the member to be mounted, a pin flange temporary holding part for temporarily fixating, before attaching to the member to be mounted, the pin flange at a first position opposite to the member to be mounted locking part relative to the bottom part, and a pin flange locking part for locking the pin flange at a second position closer to the bottom part than the first position while mounted on the member to be mounted.

In the fastener, preferably, the main body further has a side wall extending from the periphery of the bottom part to the side opposite to the member to be mounted locking part, and the pin flange locking part and the pin flange temporary holding part are formed on the side wall.

In the fastener, preferably, the pin flange temporary holding part is formed as a pair of holding claws at positions facing each other on the side wall, and the pin flange locking part is formed as a pair of locking claws at positions facing each other on the side wall.

In the fastener, preferably, the main body further has a ring-shaped main body-side annular part extending from the bottom part on the opposite side of the member to be mounted locking part relative to the bottom part and having an outer diameter larger than the diameter of the opening part; furthermore, the pin has a ring-shaped pin-side annular part extending from the pin flange toward the tip of the pin; and in a state of being mounted to the member to be mounted, the outer surface of the main body side annular part and the inner surface of the pin side annular part come into surface contact with each other.

In the fastener, preferably, the main body further extends from the bottom part in a vertical direction along the opening part at a position different from the member to be mounted locking part and is provided with a pin shaft part support part for supporting the pin shaft part.

According to the present invention, it is possible to improve the manufacturing cost of the fastener composed of the pin and the main body. In addition, quality, such as the waterproof performance of fasteners, can be improved.

DESCRIPTION OF THE PREFERRED EMBODIMENTS

Hereinafter, an embodiment of the present invention will be described with reference to the drawings. The fastener according to the embodiment of the present invention consists of the synthetic resin main body 100 shown in FIGS. 1 to 8 and the synthetic resin pin 200 shown in FIGS. 9 to 14. The pin 200 is pushed into the opening part of the main body 100 and stored in the temporarily engaged state shown in FIGS. 15 to 22. The fastener 10 in the temporarily engaged state is inserted into the mounting hole of the member to be mounted 500, and the pin 200 is further pushed into the main body 100; in this engaged state shown in FIGS. 23 and 24, the fastener 10 is mounted on the member to be mounted 500.

The fastener 10 is used to attach a mounting member such as a bumper retainer, a protector, a protective cover and a bracket to a member to be mounted 500 such as a body panel of an automobile. The body 100 of the fastener 10 may be configured as part of the bumper retainer, or the main body 100 can be configured as a separate part from the bumper retainer, and the main body 100 can be fixated to the bumper retainer.

Figure 1:
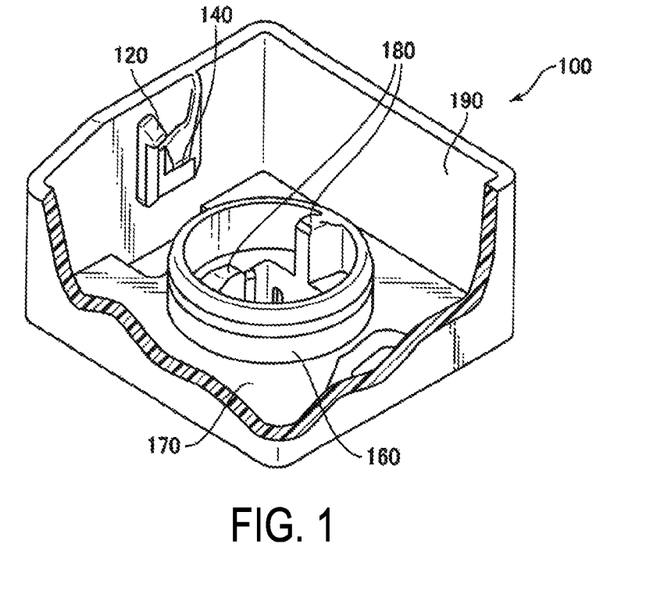
FIG. 1 is a perspective view from above of the main body of the fastener according to the embodiment of the present invention.
Figure 2:
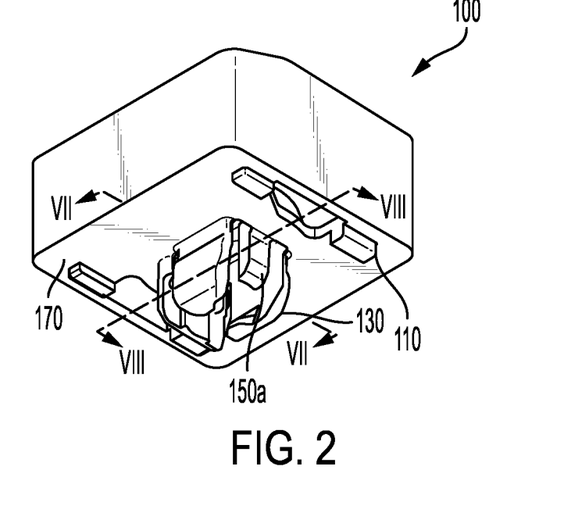
FIG. 2 is a perspective view from below of the main body of FIG. 1.
Figure 3:
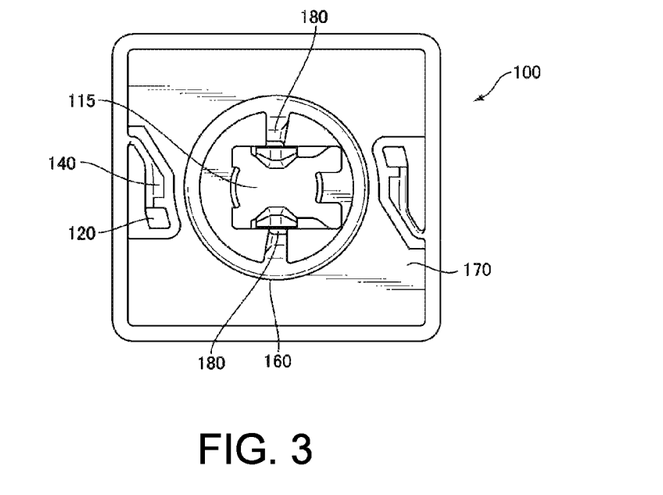
FIG. 3 is a top view of the main body of FIG. 1.
Figure 4:
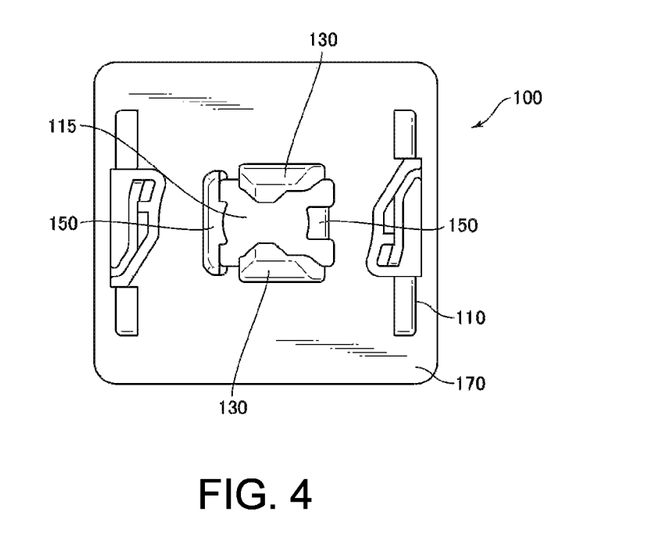
FIG. 4 is a bottom view of the main body of FIG. 1.
Figure 5:
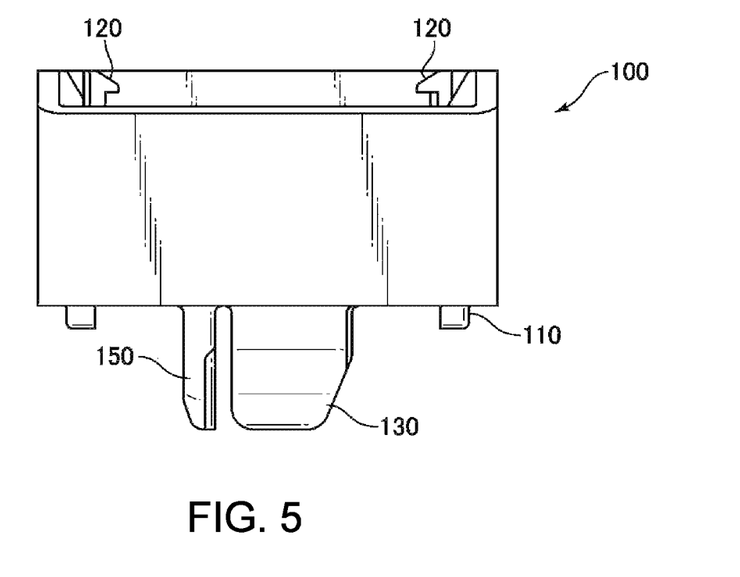
FIG. 5 is a front view of the main body of FIG. 1.
Figure 6:
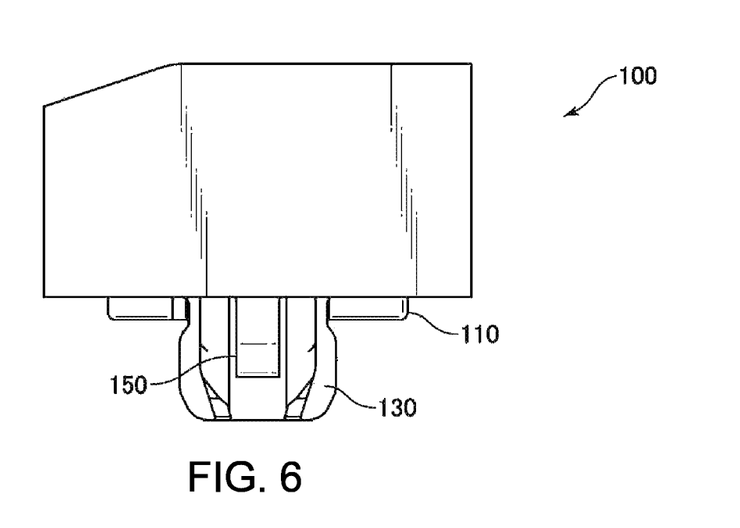
FIG. 6 is a right-side view of the main body of FIG. 1.
Figure 7:
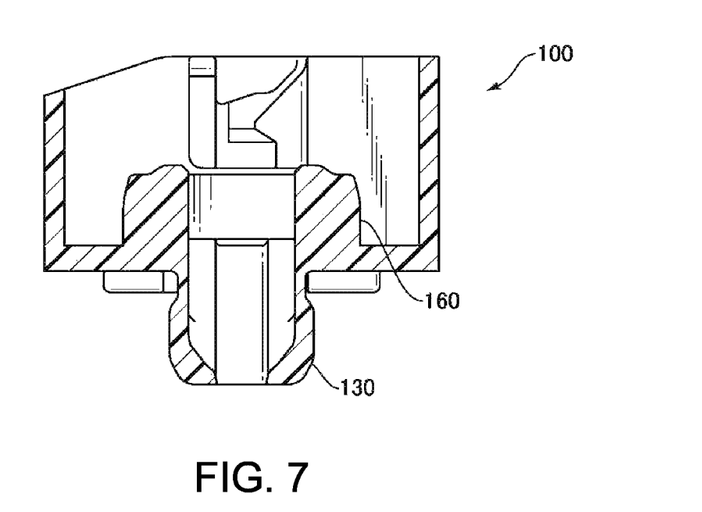
FIG. 7 is a cross-sectional view of the main body of FIG. 2 along the line VII-VII of FIG. 2.
Figure 8:
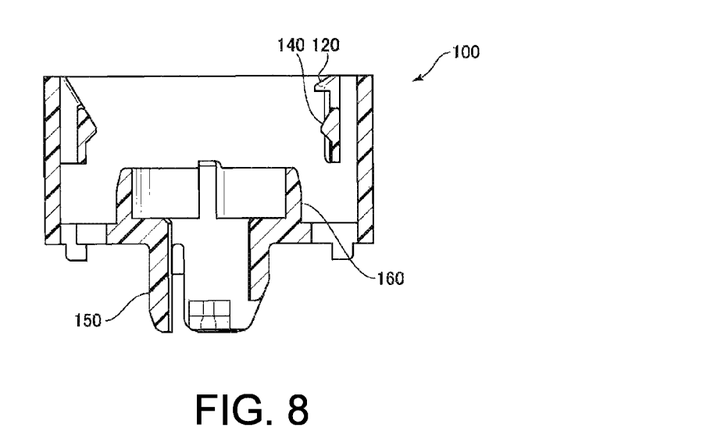
FIG. 8 is a cross-sectional view of the main body of FIG. 2 along the line VIII-VIII of FIG. 2.

The main body 100 will be described with reference to FIGS. 1 to 8. FIG. 1 is a perspective view from above of the main body 100 of the fastener 10 according to the embodiment of the present invention. FIG. 2 is a perspective view seen from below. FIG. 3 is a top view, FIG. 4 is a bottom view, FIG. 5 is a front view and FIG. 6 is a right-side view. FIG. 7 is a cross-sectional view taken along the line AA of FIG. 2. FIG. 8 is a cross-sectional view taken along the line BB of FIG. 2.

As shown in FIGS. 1 and 2, the main body 100 has a bottom part 170 with a substantially square outer shape and a side wall 190 extending upward from each end part of the bottom part 170. The upper surface of the bottom part 170 is surrounded by four side walls 190.

In the embodiment of the present invention, the main body 100 is integrated with a bumper retainer, and the bumper retainer extends beside the side wall 190 (not shown). The shape of the side wall 190 may vary, depending on the shape of the bumper retainer. For example, the bottom part 170 may be circular, in which case, the side walls may also be cylindrical.

As shown in FIGS. 3 and 4, the central part of the bottom part 170 is provided with an opening part 115 for accommodating the pin 200 to be described later. A ring-shaped main body-side annular part 160 is provided around the opening part 115 on the upper surface of the bottom part 170. The outer surface of the main body-side annular part 160 is configured to be in surface contact with the inner surface of the pin-side annular part 230 of the pin 200, which will be described later, in a state of being mounted to the member to be mounted. With this configuration, the main body 100 and the pin 200 are in close contact with each other, and it is possible to prevent the moisture that has entered the inside of the side wall 190 of the main body 100 from entering the pin shaft part 270 of the pin 200.

As shown in FIGS. 1 and 3, a pin flange temporary holding part 120 is formed on the side wall 190 in order to temporarily fixate the pin flange 220, which will be described later, in the temporarily engaged state before being mounted to the member to be mounted. Also, in order to lock the pin flange 220 in the main engaged state mounted to the member to be mounted, the pin flange locking part 140 is formed on the side wall 190 at a position closer to the bottom part 170 than the pin flange temporary holding part 120.

In the present embodiment, the pin flange temporary holding part 120 is formed as a pair of holding claws at positions facing each other on the side wall 190. Similarly, the pin flange locking part 140 is also formed as a pair of locking claws at positions facing each other on the side wall 190. In this regard, the holding claws of the pin flange temporary holding part 120 and the locking claws of the pin flange locking part 140 may each be composed of three or more claws; for example, the three claws can be arranged on the side wall 190 at equal intervals. Further, the pin flange temporary holding part 120 and the pin flange locking part 140 may be arranged in two upper and lower stages so as to be close to each other.

In the present embodiment, the pin flange temporary holding part 120 and the pin flange locking part 140 are formed on the side wall 190; however, they may be formed above the bottom part 170 of the main body 100 and may have other configurations. The pin 200, which will be described later, has a higher manufacturing cost than the tapping screw, and cost reduction has been required. Therefore, as in the present invention, by forming the pin flange temporary holding part 120 and the pin flange locking part 140 on the main body 100 instead of forming them on the pin 200 as is conventionally done, the configuration of the pin 200 can be simplified, and the manufacturing cost can be reduced.

The locking part 130 for locking to the member to be mounted extends downward from the opening part 115 along the opening part 115 formed in the bottom part 170. The locking part 130 is composed of a pair of locking claws and can be pushed by the riding surface 260 of the pin 200 to open the legs. "Open leg" refers to where the tip parts of the pair of locking claws of the locking part 130 are opened so as to be separated from each other. When mounted on the member to be mounted, the base part of the locking claw of the locking part 130 engages with the mounting hole of the member to be mounted. It can be held on the member to be mounted by the locking claws with open legs. In the present embodiment, the locking part 130 is composed of a pair of locking claws; however, other locking structures may be used as long as they are configured so that they can be locked to the member to be mounted with the bottom part 170.

Further, the support part 150 for supporting the pin 200 extends downward from the opening part 115 to a position different from the locking part 130 along the opening part 115 formed in the bottom part 170. For example, the support part 150 can be formed as a pair of support legs between the pair of locking claws of the locking part 130. As shown in FIG. 8, one of the support legs has substantially the same length as the locking claw of the locking part 130. As shown in FIG. 4, the outer surface of the pair of support legs of the support part 150 is substantially flat, and the lateral central part of the inner surface has an arcuate cross section so as to match the pin shaft part 270 of the pin 200. In the embodiment of the present invention, the shapes of one support leg and the other support leg are different, but the shape of the support leg is not limited to that shown in the embodiment. As for the shape of the support legs, it is sufficient that the support legs can be inserted into the mounting holes of the members to be mounted and the pin shaft part 270 can be guided inside the pair of support legs.

Further, on the lower side surface of the bottom part 170, four members to be mounted contact parts 110 configured to be mounted on the member to be mounted are formed at the end of the bottom part 170. The heights of the four members to be mounted contact parts 110 are constant so that they can be mounted on the member to be mounted with high accuracy and stability. A packing 300, to be described later, can be arranged between the member to be mounted contact parts 110 arranged at the ends of the bottom part 170, respectively, when mounting is performed to the member to be mounted.

As shown in FIGS. 1 and 3, a pair of opposite pin release ribs 180 are provided between the inside of the main body side annular part 160 and the opening part 115. The pin release ribs 180 are higher in height than the main body side annular part 160 toward the center of the main body side annular part 160. The pin release ribs 180 are used when returning the pin 200 from the main engagement to the temporarily engaged state.

As shown in FIG. 4, the outer shape of the cross section of the pair of locking claws of the locking part 130 and the pair of supporting legs of the supporting part 150 is substantially rectangular; it is formed so as to fit into the mounting hole of the member to be mounted 500, and the pair of locking claws and the pair of support legs can be inserted into the mounting hole of the member to be mounted 500.

Further, the opening part 115 of the main body 100 is a space surrounded by a pair of locking claws of the locking part 130 and a pair of supporting legs of the supporting part 150. The pin shaft part 270 of the pin 200 is guided into the opening part 115 of the main body 100.

The distance between the pair of support legs of the support part 150 is equal to or slightly larger than the outer diameter of the pin shaft part 270, and the pair of support legs are configured to support the pin shaft part 270 from the outside.

Figure 9:
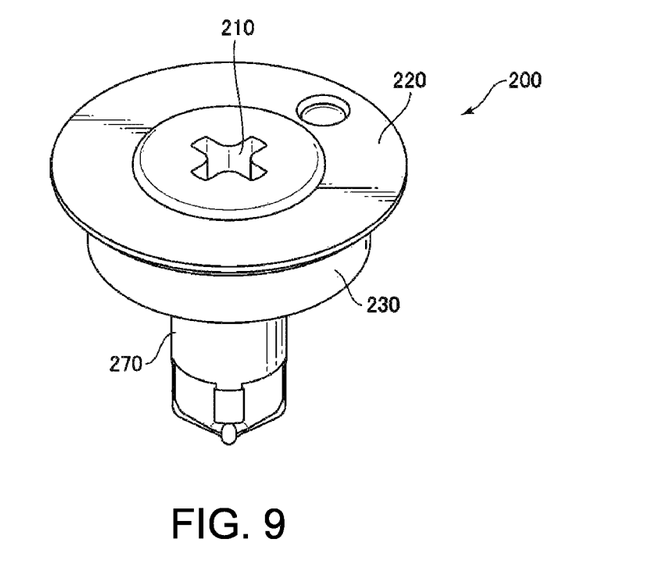
FIG. 9 is a perspective view from above of a fastener pin according to an embodiment of the present invention.
Figure 10:
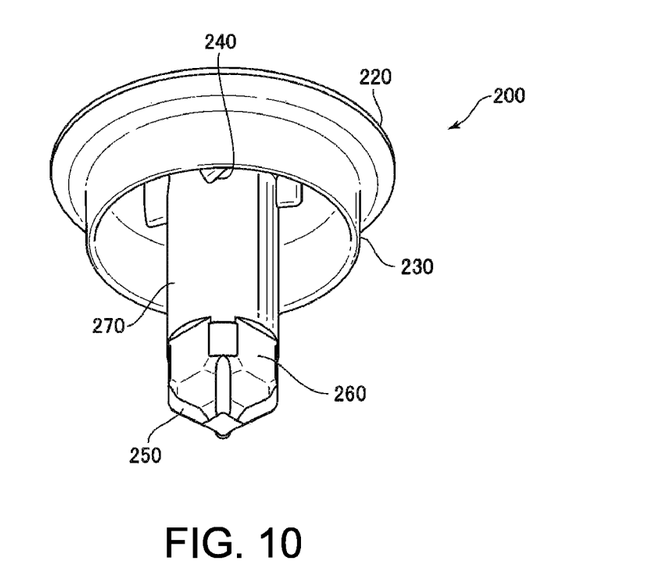
FIG. 10 is a perspective view from below of the pin of FIG. 9.
Figure 11:
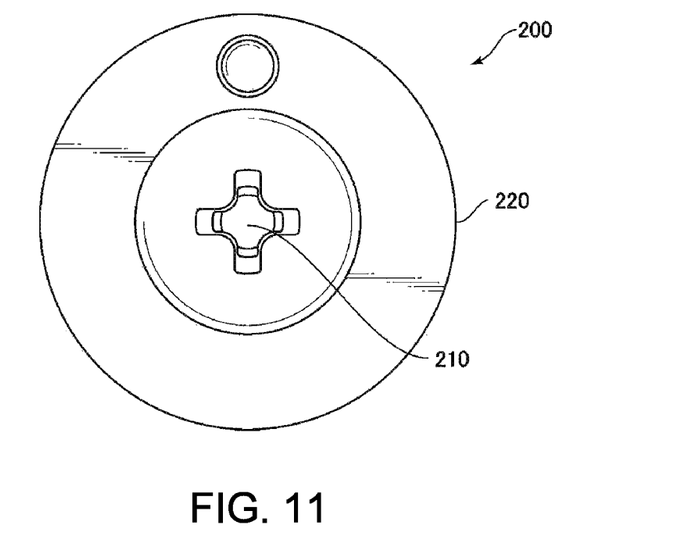
FIG. 11 is a top view of the pin of FIG. 9.
Figure 12:
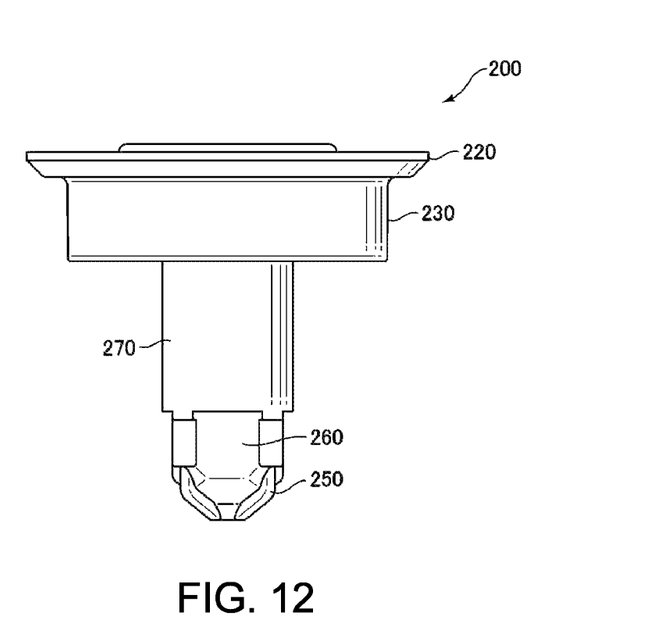
FIG. 12 is a front view of the pin of FIG. 9.

The pin 200 will now be described with reference to FIGS. 9 to 14. FIG. 9 is a perspective view of the pin 200 of the fastener 10 according to the embodiment of the present invention as viewed from above, and FIG. 10 is a perspective view of the pin 200 as viewed from below. FIG. 11 is a top view, FIG. 12 is a front view, FIG. 13 is a bottom view and FIG. 14 is a cross-sectional view.

Pin 200 has an upper disk-shaped pin flange 220, a ring-shaped pin-side annular part 230 extending downward from the outside of the pin flange 220 and a pin shaft part 270 extending downward from the central part of the pin flange 220.

As shown in FIG. 9, a cross groove 210 is formed on the upper surface of the central part of the pin flange 220. The tip part of the driver is inserted into the cross groove 210, and the pin 200 can be rotated to return from the main engagement to the temporary engagement state. As shown in FIG. 14, the cross groove 210 may be formed deeply to the position of the riding surface 260 of the pin shaft part 270.

Figure 13:
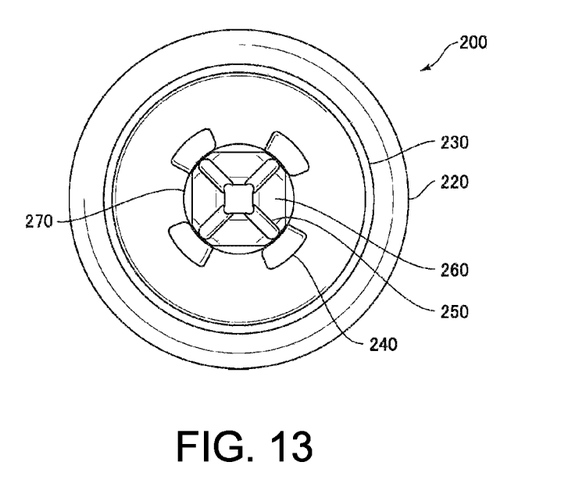
FIG. 13 is a bottom view of the pin of FIG. 9.
Figure 14:
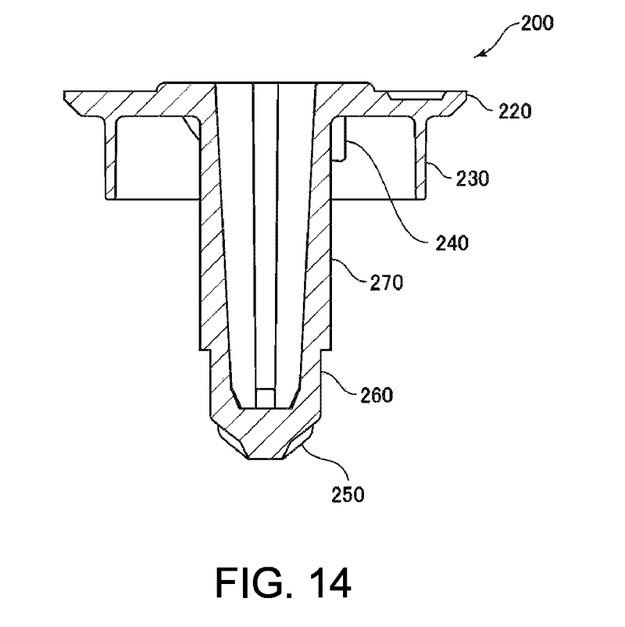
FIG. 14 is a cross-sectional view of the pin of FIG. 9.

As shown in FIGS. 10 and 13, four pin release pieces 240 are formed at equal intervals around the pin shaft part 270 on the lower side of the pin flange 220. The pin release piece 240 has a constant thickness in the radial direction of the pin flange 220, the outer surface is in the shape of a right triangle, and the lower surface is a slope. This slope gradually decreases in height clockwise. When the pin 200 is rotated to return from the main engagement to the temporary engagement state, the slope of the pin release pieces 240 slides on the pin release rib 180 of the main body 100 so that the pin 200 is pushed up.

As shown in FIG. 12, a pin shaft part 270 extends along the central axis of the pin 200 below the central portion of the pin flange 220. The pin shaft part 270 includes a pin rotation position regulating rib 250 that regulates the rotation of the pin 200, and a riding surface 260 on which the tip of the locking part 130 of the main body 100 is opened to ride on.

The pin 200 has a ring-shaped pin-side annular part 230 extending from the outside of the pin flange 220 toward the tip of the pin 200. As will be described later, in the main engaged state in which the fastener 10 is mounted to the member to be mounted 500, the pin-side annular part 230 is configured such that the outer surface of the main body-side annular part 160 of the main body 100 and the inner surface of the pin-side annular part 230 are in surface contact with each other; with this configuration, the main body 100 and the pin 200 are in close contact with each other in this engaged state, and it is possible to prevent moisture from entering the pin shaft part 270 of the pin 200 from the outside of the pin 200.

Further, as shown in FIGS. 12 and 14, the pin 200 does not have a shape that becomes an undercut at the tip part of the pin. In the prior art, in the structure for temporarily holding and locking the pin to the main body, an undercut portion is formed at the tip part of the pin; in this case, it was necessary to provide a slide core in the mold. In contrast, in the present invention, the main body 100 is formed with a structure for temporarily holding and locking the pin 200 to the main body 100; the structure of the pin 200 is one that eliminates the undercut portion so that it is not necessary to provide a slide core in the mold, thereby reducing the manufacturing cost.

Figure 15:
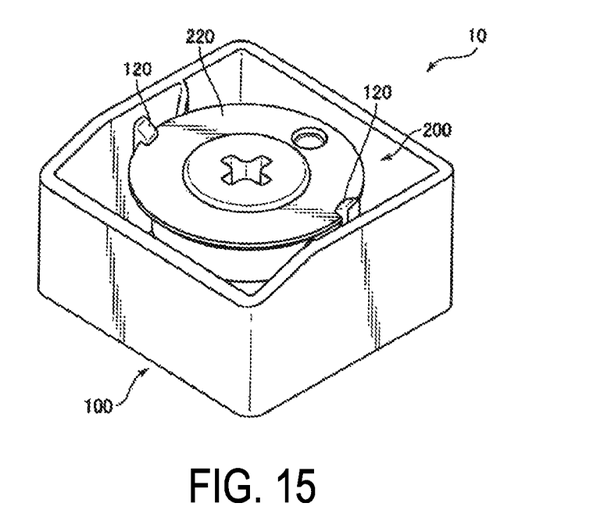
FIG. 15 is a perspective view from above of a fastener in a state in which the main body of FIG. 1 and the pin of FIG. 9 are temporarily engaged.
Figure 16:
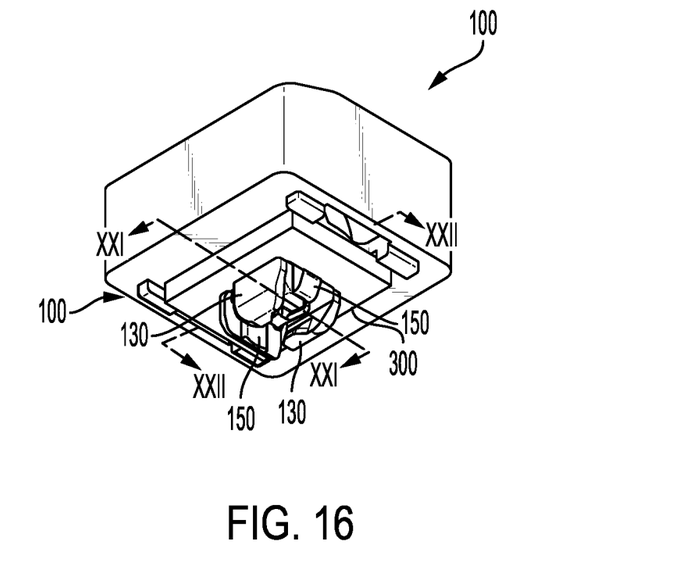
FIG. 16 is a perspective view from below of the fastener in a state where the main body of FIG. 1 and the pin of FIG. 9 are temporarily engaged.
Figure 17:
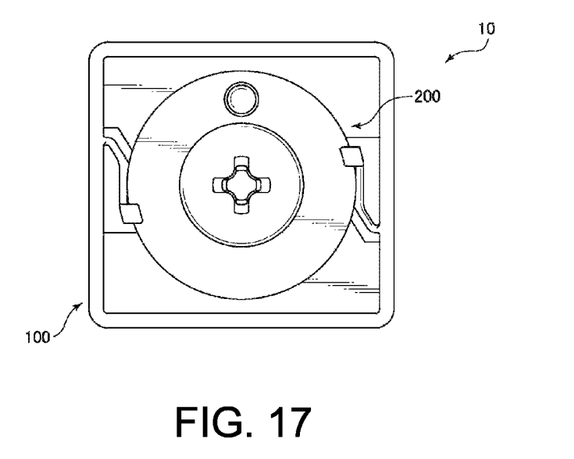
FIG. 17 is a top view of the fastener of FIG. 16.
Figure 18:
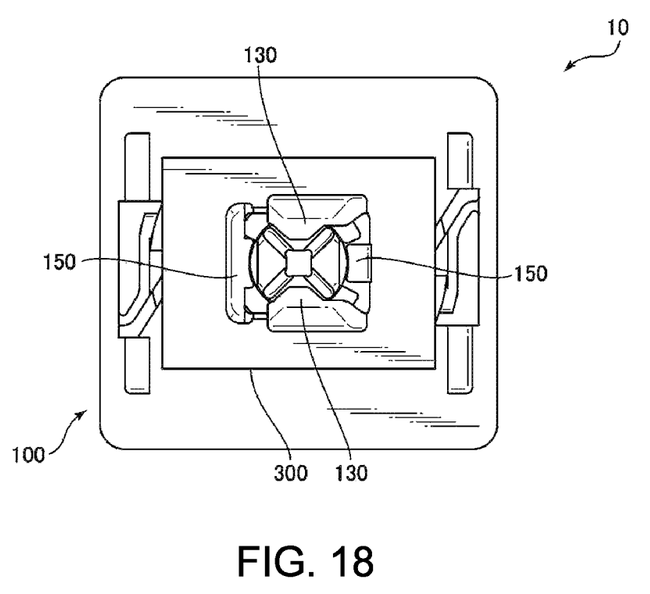
FIG. 18 is a bottom view of the fastener of FIG. 16.
Figure 19:
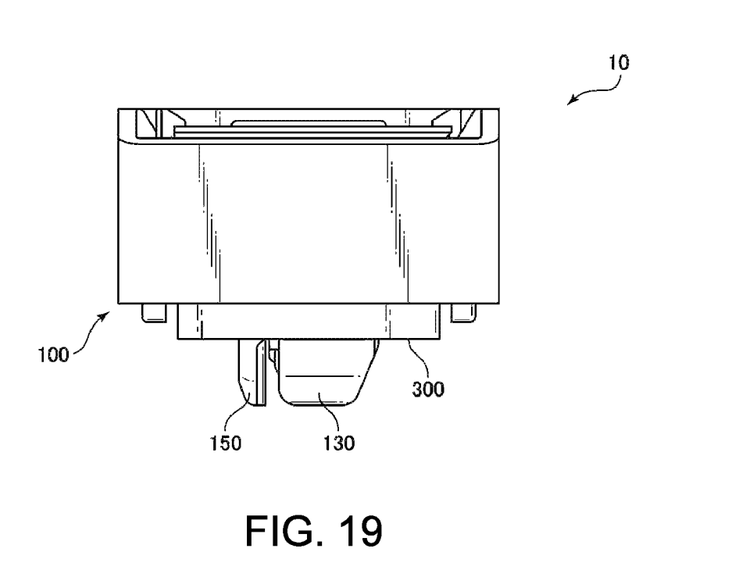
FIG. 19 is a front view of the fastener of FIG. 16.
Figure 20:
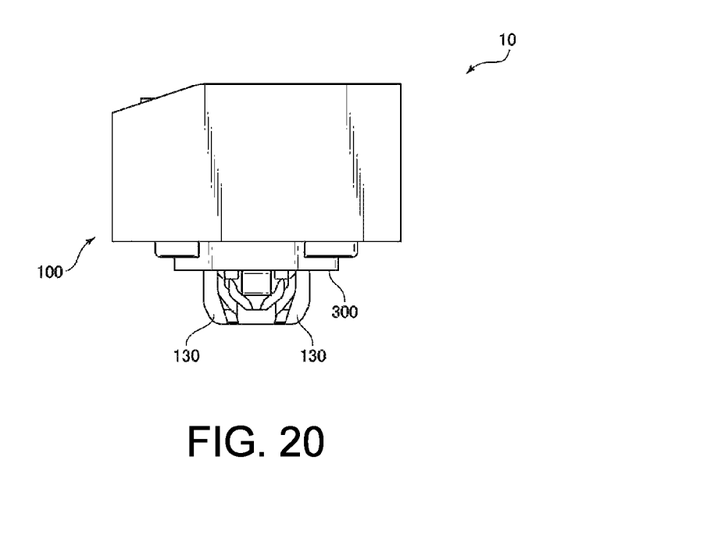
FIG. 20 is a right-side view of the fastener of FIG. 16.
Figure 21:
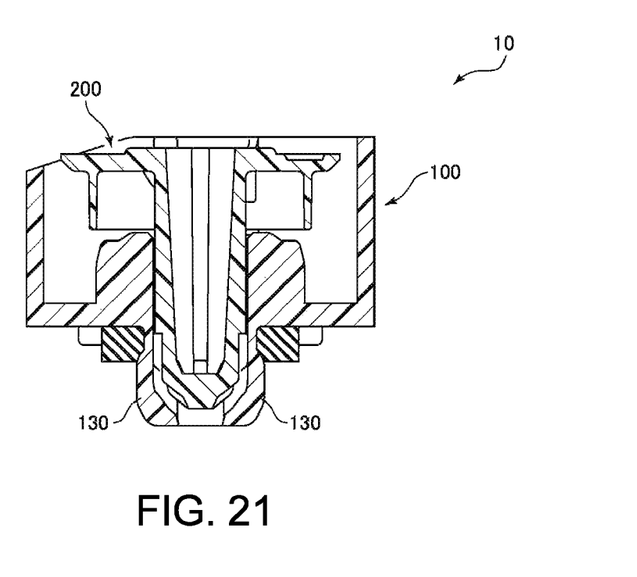
FIG. 21 is a cross-sectional view of the fastener of FIG. 16 along the line XXI-XXI of FIG. 16.

According to the fastener 10 as per the present invention, before mounting the fastener 10 to the member to be mounted, the fastener 10 is stored in a state in which the main body 100 and the pin 200 are assembled and temporarily engaged with each other; it is then delivered to the assembly department for mounting on the member to be mounted. FIG. 15 is a perspective view of the fastener 10 in a state where the main body 100 and the pin 200 are temporarily engaged, as viewed from above. FIG. 16 is a perspective view seen from below. FIG. 17 is a top view, FIG. 18 is a bottom view, FIG. 19 is a front view and FIG. 20 is a right-side view. FIG. 21 is a cross-sectional view taken along the line AA of FIG. 16, and FIG. 22 is a cross-sectional view taken along the line BB of FIG. 16.

Figure 22:
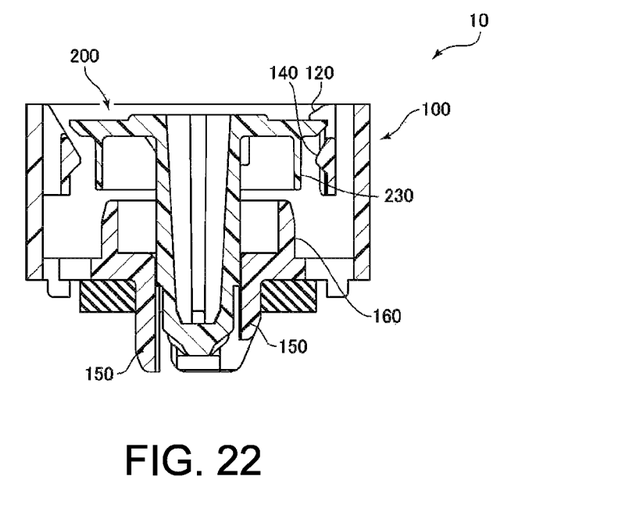
FIG. 22 is a cross-sectional view of the fastener of FIG. 16 along the line XXII-XXII of FIG. 16.

As shown in FIGS. 15 and 22, in the temporarily engaged state, the pin flange 220 of the pin 200 is temporarily fixated by a pair of claws of the pin flange temporary holding part 120 of the main body 100, and the pin 200 can be stored in a state of being held by the main body 100.

Also, in the temporarily engaged state, as shown in FIG. 21, the tip of the pin 200 is housed above the locking part 130 of the main body 100, and the pair of locking claws are not opened. Further, as shown in FIG. 22, a pair of support legs of the support part 150 of the main body 100 support the pin shaft part 270 of the pin 200.

From the temporarily engaged state shown in FIGS. 15 to 22, when the mounting holes of the member to be mounted 500 are aligned with the opening part 115 formed in the bottom part 170 of the main body 100, by pushing the pin 200 downward, the fastener 10 can be mounted on the member to be mounted 500 to become fully engaged.

Figure 23:
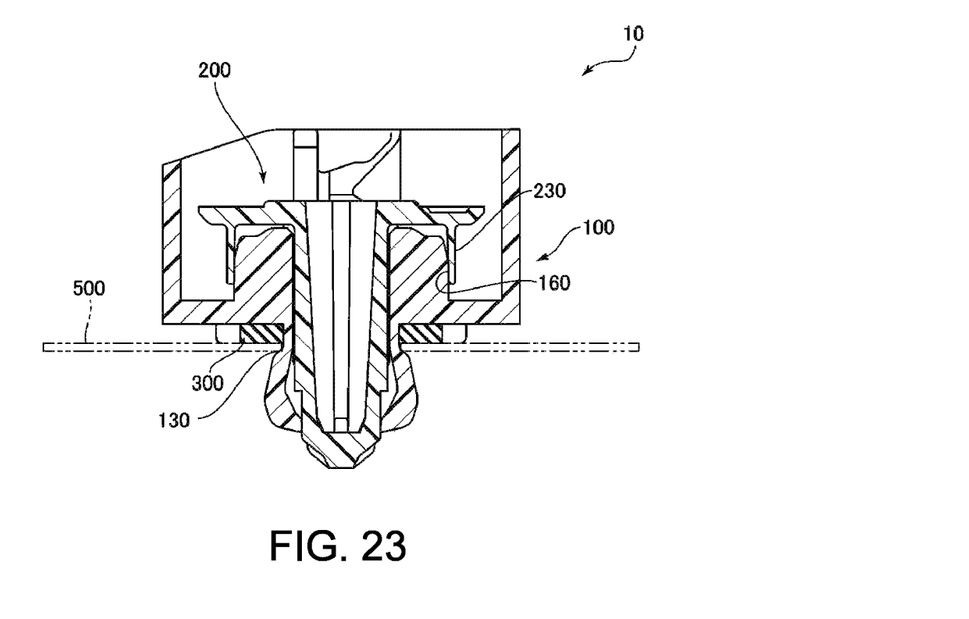
FIG. 23 is a cross-sectional view taken along the same cross section as line XXI-XXI of FIG. 16 in this engaged state.

FIG. 23 is a cross-sectional view taken along the same cross section as the AA line of FIG. 16 where the fastener 10 is mounted on the member to be mounted 500 and is fully engaged. Further, FIG. 24 is a cross-sectional view taken along the same cross section as the BB line of FIG. 16, fully engaged.

Figure 24:
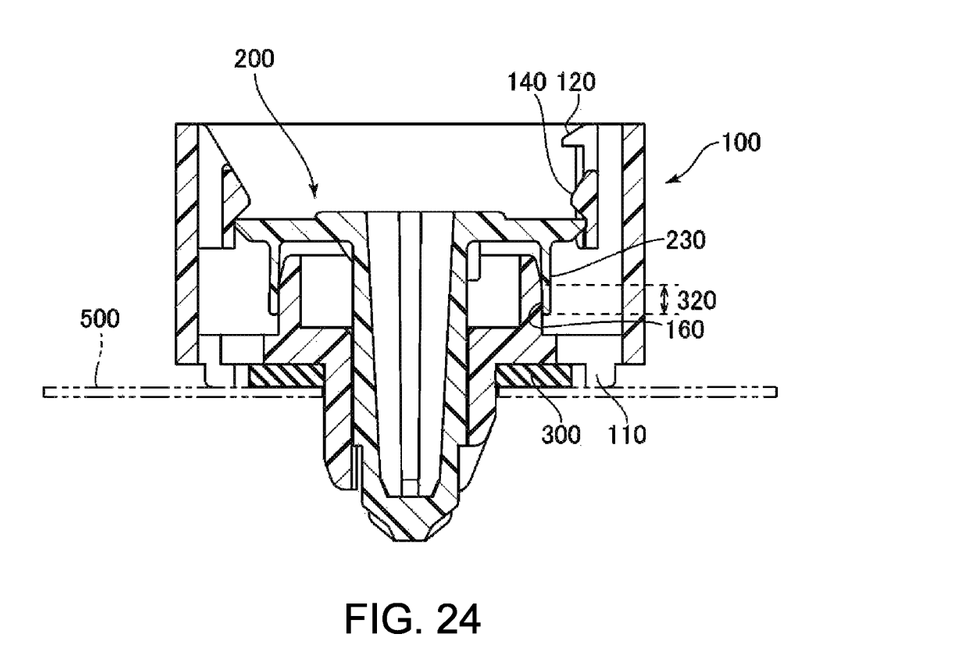
FIG. 24 is a cross-sectional view taken along the same cross section as line XXII-XXII of FIG. 16 in this engaged state.

By pushing the pin 200 downward from the state of being temporarily engaged, the pin flange 220 held by the pin flange temporary holding part 120 moves downward and is locked by a pair of locking claws of the pin flange locking part 140 as shown in FIG. 24, and thus becomes engaged.

As shown in FIG. 23, this engaged state is configured so that the tip of the pin 200 projects from between the pair of locking claws of the locking part 130 to open the pair of locking claws and locked to the member to be mounted 500 by the opened base of the pair of locking claws of the locking part 130.

Further, in this engaged state, as shown in FIG. 24, the pair of support legs of the support portion 150 of the main body 100 support the pin shaft part 270 of the pin 200.

In addition, in this engaged state as shown in FIGS. 23 and 24, the inner surface of the ring-shaped pin-side annular part 230 of the pin 200 is configured to be in surface contact with the outer surface of the ring-shaped main body-side annular part 160 of the main body 100. In this way, the main body 100 and the pin 200 are in close contact with each other, and it is possible to prevent the infiltration of water from the upper side of the figure of the pin 200. In a conventional fastener, the capability of waterproofing is not sufficiently considered, and the structure is such that the flexible thin-walled flange on the pin side is brought into line contact with the main body side. On the other hand, in the present invention, by contact of the surfaces of the pin-side annular part 230 and the main body-side annular part 160, the area of the contact part 320 can be increased, and the waterproofing capability can be improved. Further, as shown in FIG. 24, when the contact part 320 is in surface contact, since the structure is such that the pin-side annular part 230 is covered with the opening of the main body-side annular part 160, in order for the water that has entered the vicinity of the pin flange 220 to enter the inside of the pin 200, the water enters the surface contact portion from the lower end side of the pin-side annular part 230 in the figure, and it is then necessary to advance the surface contact portion upward in the figure, which becomes an intrusive route rendering it difficult for moisture to infiltrate, so as to enhance the waterproof capability.

In the present invention, as described above, the pin 200 structurally excludes the undercut part; further, in order to improve the waterproofing capability, its structure is that of a ring-shaped pin-side annular part 230 extending from the pin flange 220 toward the tip of the pin 200. That is, the pin 200 functions to improve waterproofing while maintaining a simple structure without an undercut, which contributes to both a reduction in fastener manufacturing cost and improvement of functionality.

Moreover, inside the member to be mounted contact part 110 is a packing 300 that comes into contact with the member to be mounted 500; the packing 300 prevents moisture from entering from the outside of the fastener on the member 500 to be attached, thereby improving the waterproofing capability.

As described above, the present invention can reduce the manufacturing cost by eliminating the shape of the pin tip that is undercut. In this respect, in the present invention, by eliminating the undercut shape, temporary holding and locking at the pin tip cannot be performed; however, this is solved by providing the pin flange temporary holding part 120 and the pin flange locking part 140 in two stages on the main body 100 side. In the present invention, the contact area can be further increased by bringing the pin flange into surface contact with the main body, and the waterproofing capability can be improved.

What is claimed is:

1. A fastener for securing to a member to be mounted defining a through hole, the fastener comprising:
a pin, and; wherein the pin includes a pin flange and a pin shaft extending in the vertical direction from the pin flange; and
a main body configured to insert the pin and the main body includes:
a bottom part including a first side and a second side vertically opposite to the first side,
an opening partially defined in and vertically through the bottom part for inserting the pin,
a member to be mounted locking part extending vertically from the second side of the bottom part along the opening, the member to be mounted locking part insertable though the through hole of the member to be mounted and operable with the pin to lock to the member to be mounted,
a pin flange temporary holding part for temporarily fixating, before attaching to the member to be mounted, the pin flange at a first position relative to the first side of the bottom part, and
a pin flange locking part for locking the pin flange at a second position closer to the first side of the bottom part than the first position when mounted on the member to be mounted; and
wherein:
the main body further includes a ring-shaped main body-side annular part extending vertically from the first side of the bottom part and radially around the opening, the ring-shaped main body side annular part defining an outer diameter; and
the pin further includes a ring-shaped pin-side annular part extending vertically from the pin flange toward a tip of the pin, and when mounted on the member to be mounted, an outer surface of the main body side annular part and an inner surface of the pin side annular part come into surface contact.

2. The fastener according to claim 1, wherein the main body further includes a side wall extending vertically from the bottom part on the first side opposite to the member to be mounted locking part, and the pin flange locking part and the pin flange temporary holding part are formed on the side wall.

3. The fastener according to claim 2, wherein the pin flange temporary holding part is formed as a pair of holding claws at first locations facing each other on the side wall, and the pin flange locking part is formed as a pair of locking claws at second locations facing each other on the side wall.

4. The fastener according to claim 1, wherein the main body further includes a pin shaft part support part extending vertically from the second side of the bottom part in a vertical direction along the opening at a position different from that of the member to be mounted locking part, and the pin shaft part support part supports the pin shaft.

5. A fastener for securing to a workpiece defining a through hole, the fastener comprising:

a pin including a pin flange extending radially and a pin shaft extending axially from an underside of the pin flange to a flange tip; and a body including:
- a bottom including a first side and a second side axially opposite to the first side;
- an opening partially defined in and axially through the bottom;
- a first wall extending axially from the bottom on the first side;
- a workpiece lock extending vertically from the second side of the bottom adjacent to the opening;
- a pin flange temporary holding part operable for temporarily holding the pin flange at a first axial position relative to the first side of the bottom;
- a pin flange locking part operable for locking the pin flange at a second axial position closer to the first side of the bottom than the first axial position; and
- the pin flange locking part and the pin flange temporary holding part are formed on the first wall; and wherein, in a first condition of the fastener, the pin extends through the opening in the bottom of the body with the pin flange held at the first position by the pin flange temporary holding part, and the workpiece lock is in a relaxed condition and insertable though the through hole of the workpiece; and wherein, in a second condition of the fastener, the pin extends through the opening in the bottom of the body with the pin flange held at the second position by the pin flange locking part, and the workpiece lock is radially outward deflected by the pin into a bent condition in which bent condition the fastener is not removable from the through hole of the workpiece.

6. The fastener according to claim 5, wherein the pin flange temporary holding part includes a holding claw at a first location on the first wall, and the pin flange locking part includes a locking claw at a second location on the first wall, the first location axially further than the second location from the first side of the bottom.

7. The fastener according to claim 5, wherein:
the body further includes a second wall extending axially from the first side of the bottom and radially surrounding the opening, the second wall having a radially outer surface;
the pin further includes a flange skirt extending axially from the pin flange and radially surrounding the pin shaft, the flange skirt having a radially inner surface; and
when the fastener is in the second condition, the radially outer surface of the second wall is radially inward of and in surface-to-surface contact with the radially inner surface of flange skirt.

8. The fastener according to claim 7, wherein:
the second wall is an annular wall defining an outer diameter; and
the flange skirt is an annular skirt defining an inner diameter greater than the outer diameter; and
when the fastener is in the second condition, the annular wall is concentric with and radially inward of the annular skirt with the radially outer surface of the annular wall radially inward of and in surface-to-surface contact with the radially inner surface of the annular skirt.

9. A fastener for securing to a workpiece defining a through hole, the fastener comprising:
a pin including a pin flange extending radially and a pin shaft extending axially from an underside of the pin flange to a flange tip and a flange skirt extending axially from the pin flange and radially surrounding the pin shaft, the flange skirt having a radially inner surface; and a body including:
- a bottom including a first side and a second side axially opposite to the first side;
- an opening partially defined in and axially through the bottom;
- a first wall extending axially from the first side of the bottom and radially surrounding the opening, the first wall having a radially outer surface;
- a workpiece lock extending vertically from the second side of the bottom adjacent to the opening; and wherein a first condition of the fastener, the pin is in a first axial position and extends through the opening in the bottom of the body, and the workpiece lock is in a relaxed condition and insertable though the through hole of the workpiece; and wherein a second condition of the fastener, the pin is in a second axial position and extends through the opening in the bottom of the body, and the workpiece lock is deflected radially outward by the pin into a bent condition in which bent condition the fastener is not removable from the through hole of the workpiece, and the radially outer surface of the first wall is radially inward of and in surface-to-surface contact with the radially inner surface of the flange skirt.

10. The fastener according to claim 9, wherein:
the first wall is an annular wall defining an outer diameter; and
the flange skirt is an annular skirt defining an inner diameter greater than the outer diameter; and
when the fastener is in the second condition, the annular wall is concentric with and radially inward of the annular skirt with the radially outer surface of the annular wall radially inward of and in surface-to-surface contact with the radially inner surface of the annular skirt.

11. The fastener according to claim 10, wherein the pin flange temporary holding part includes a holding claw at a first location on the second wall, and the pin flange locking part includes a locking claw at a second location on the second wall, the first location axially further than the second location from the first side of the bottom.

12. The fastener according to claim 9, wherein the body further includes:
a second wall extending axially from the first side of the bottom and radially outward of the first wall;
a pin flange temporary holding part located on the second wall and operable for temporarily holding the pin flange at the first axial position relative to the first side of the bottom; and
a pin flange locking part located on the second wall and operable for locking the pin flange at the second axial position closer to the first side of the bottom than the first axial position; and
wherein the first condition of the fastener the pin flange is held at the first axial position by the pin flange temporary holding part; and
wherein the second condition of the fastener the pin flange is held at the axial second position by the pin flange locking part.

13. A fastener for securing to a member to be mounted defining a through hole, the fastener comprising:

a pin, and; wherein the pin includes a pin flange and a pin shaft extending in the vertical direction from the pin flange; and a main body configured to insert the pin and the main body includes:

a bottom part including a first side and a second side vertically opposite to the first side;

an opening partially defined in and vertically through the bottom part for inserting the pin;

a member to be mounted locking part extending vertically from the second side of the bottom part along the opening, the member to be mounted locking part insertable though the through hole of the member to be mounted and operable with the pin to lock to the member to be mounted;

a side wall extending vertically from the bottom part on the first side opposite to the member to be mounted locking part;

a pin flange temporary holding part for temporarily fixating, before attaching to the member to be mounted, the pin flange against withdrawal at a first position relative to the first side of the bottom part;

a pin flange locking part for locking the pin flange at a second position closer to the first side of the bottom part than the first position when mounted on the member to be mounted; and the pin flange locking part and the pin flange temporary holding part are formed on the side wall.

14. The fastener according to claim 13, wherein the pin flange temporary holding part is formed as a pair of holding claws at first locations facing each other on the side wall, and the pin flange locking part is formed as a pair of locking claws at second locations facing each other on the side wall.

15. The fastener according to claim 13, wherein:

the main body further includes a ring-shaped main body-side annular part extending vertically from the first side of the bottom part and radially around the opening, the ring-shaped main body side annular part defining an outer diameter; and the pin further includes a ring-shaped pin-side annular part extending vertically from the pin flange toward a tip of the pin, and when mounted on the member to be mounted, an outer surface of the main body side annular part and an inner surface of the pin side annular part come into surface contact.

16. The fastener according to claim 13, wherein the main body further includes a pin shaft part support part extending vertically from the second side of the bottom part in a vertical direction along the opening at a position different from that of the member to be mounted locking part, and the pin shaft part support part supports the pin shaft.

* * * * *